United States Patent Office 3,325,320
Patented June 13, 1967

3,325,320
METHOD OF SELECTIVELY ETCHING METALS
Clayton C. Shepherd, Jr., Bellflower, Calif., assignor to North American Aviation, Inc.
No Drawing. Continuation of abandoned application Ser. No. 607,301, Aug. 31, 1956. This application June 28, 1962, Ser. No. 205,855
1 Claim. (Cl. 156—13)

This invention relates to a novel rubber composition to be adhered to metal, the rubber composition being resistant to corrosive action of various chemicals. This application is a continuation of my copending application Ser. No. 607,301, filed Aug. 31, 1956, now abandoned.

It is known in the art to use protective films on metal workpieces subjected to the action of chemical etching solutions. The purpose of the film is to protect the surfaces of the workpieces which are not to be etched. A number of masking compositions for such films have been developed for service in various chemical etching solutions. However, a suitable maskant has not been developed to date for service in strong acid solution. An example of such an acid solution is a mixed nitric, hydrochloric and phosphoric acid etching solution ordinarily used for etching steel.

It is therefore an object of this invention to provide a rubber composition suitable for forming acid resistant protective films on metal surfaces. It is likewise an object to provide chemical resistant protective films which have high tensile strength, good adhesion to metal surfaces and can be readily stripped from the surface after use. Another object is to provide metal and metal alloy articles having adherent films thereon. An additional object is to provide methods for selectively etching predetermined surface areas of metal articles or workpieces. Other objects will become more apparent from the discussion which follows.

The above and other objects are provided by a composition of matter suitable for the preparation of a chemical-resistant rubber comprising 100 parts of a polymer obtained by copolymerizing a major portion of an aliphatic isoolefin having 4 to 7, inclusive, carbon atoms per molecule with a minor proportion of a conjugated diolefin having 4 to 8, inclusive, carbon atoms per molecule; about 5–30 parts chloroprene polymer; about 3–15 parts of a reactive metal oxide; about 2–10 parts of a compatible sulfurization agent; about 1–5 parts of a compatible plasticizer and about 40–95 parts of an inert filler. When a homogeneous mixture of the above components is heated to a temperature within the range of 150° C. to 200° C., the composition is vulcanized and sets into a resilient rubber which is resistant to the action of corrosive acids such as nitric, hydrochloric, hydrofluoric, and phosphoric and solutions of metallic halide salts such as ferric chloride, fluotitanic acid, as well as combinations of these acids and salts in various proportions. The rubber also resists the action of the products of such mixtures as, for example, oxides of nitrogen. The cured or vulcanized composition is also found to have a high degree of impermeability to the above-mentioned chemical solutions. The composition is useful in the manufacture of rubber tubing, rubber hose and other rubber articles. The composition is especially useful in the manufacture of chemical-resistant films. For example, when the above-described composition is dissolved in a suitable hydrocarbon solvent, applied to the surface of an object in the form of a film of suitable thickness, and heated to a temperature sufficient to bring about reaction and setting or vulcanization, there is produced a resilient rubber film which will protect the coated surface from the action of severe corrosion agents such as hydrochloric, nitric and phosphoric acids, to which the object may be exposed.

When used for providing rubber films on the surface of different articles, the composition contains, in addition to the components named above, from about 200 to about 2000 weight percent of a compatible solvent based on the amount of the isoolefin-diolefin copolymer. Suitable solvents for this purpose are: aromatic hydrocarbon compounds such as toluene, xylene, benzene, alkyl substituted naphthalenes, etc.; aliphatic hydrocarbons such as hexane, octane, petroleum hydrocarbon fractions, naphthenes, etc.; as well as mixtures of two or more of the various solvents. Halogenated hydrocarbon solvents may also be used. Examples of the latter are carbontetrachloride, ethylenedichloride, trichloroethylene, ethylene-dibromide, dichlorohexane, methylenedichloride, chlorobenzene, propylenedichloride, chlorotoluene, etc.

The amount of conjugated diolefin in the isoolefin-diolefin copolymer is from about 1.5 to about 4.5 weight percent based on the weight of the copolymer. A preferred embodiment of this invention comprises the composition of matter as described above in which the isoolefin-diolefin polymer comprises a polymer obtained by copolymerizing isobutylene with 1.5–4.5 weight percent isoprene, which is 2-methylbutadiene. This isobutyleneisoprene copolymer is hereinafter called simply butyl polymer.

The method of preparation of the isoolefin-diolefin polymers is found in U.S. Patents 2,356,128 and 2,356,130. The butyl polymer, referred to above, is also prepared by the method stated in these patents and in textbooks on organic chemistry generally. The various butyl polymers are commercially available. Butyl polymer generally designated GR–I50 containing 2 weight percent isoprene based on isobutylene, is found to be especially suitable for the preparation of masking films having a high degree of chemical resistance. Therefore, butyl polymer and chloroprene polymer compositions in which the former is a copolymer of isobutylene with substantially 2 weight percent isoprene constitutes a preferred embodiment of this invention.

The chloroprene polymer, also known as neoprene, used in the preparation of the chemical resistant composition is polymerized chloroprene which is 2-chloro-1,3-butadiene. The preparation of chloroprene polymers is also well described in the literature and may be found in papers published by Nieuland et al., J. Am. Chem. Soc., 53, 4197–202 (1931), Carothers et al, J. Am. Chem. Soc., 53, 4203–25 (1931), and Walker and Mochel, Proc. Second Rubber Tech. Conf., 69–78 (1948). Both the sulfur-modified and the nonmodified chloroprene polymers are commercially available. The sulfur-modified chloroprene polymers containing from about 0.1 to about 1.0 percent sulfur based on the weight of the chloroprene, are found to be more suitable in the preparation of chemical-resistant masking compositions because of their greater solubility in hydrocarbon solvents. Chloroprene polymers obtained by copolymerizing chloroprene in the presence of substantially 0.6 weight percent sulfur impart the required degree of adhesiveness to the finished chemical-resistant film when the latter are used to protect metal surfaces. Therefore, chemical-resistant butyl polymer and chloroprene polymer compositions in which the chloroprene polymer is modified with substantially 0.6 weight percent sulfur based on the chloroprene, constitute a preferred embodiment of this invention. Commercial sulfur-modified chloroprene polymers having the required amount of sulfur are the neoprene GN and KNR polymers. The nonsulfur-containing chloroprene polymers impart a very high degree of adhesion to the finished film and are used in film compositions which are to be employed on highly polished surfaces such as highly polished steel surfaces, and also where strippability of the film is not a factor for consideration.

The purposes of illustration of the instant invention will be described hereinafter in terms of butyl polymers and chloroprene polymers. However, the discussion will apply with equal force to compositions equivalent to butyl polymers comprising copolymers of aliphatic isoolefins having 4 to 7, inclusive, carbon atoms per molecule with conjugated aliphatic diolefins having 4 to 8, inclusive, carbon atoms per molecule. Nonlimiting examples of isoolefins employed are isobutylene and 2-ethylpentene-1. Examples which illustrate the type of conjugated diolefins that are used include butadiene and 2,3-dimethylhexadiene-1,3.

The combination of butyl and chloroprene polymers for the manufacture of the chemical resistant rubber is in the proportions of from about 5 to about 30 weight percent chloroprene polymer based on the amount of butyl polymer employed. However, the maximum resistance to chemical attack is possessed by the rubber composition of this invention when the amount of chloroprene polymer used is from 5 to about 15 weight percent based on the amount of butyl polymer employed. Therefore, compositions having butyl and neoprene polymers in the latter proportions constitute a preferred embodiment of this invention.

Use of the metal oxide accelerators is well known in the rubber vulcanization process. From 3 to about 15 weight percent of these oxides based on the butyl polymer are added to produce a fast cure as well as a uniform state of cure. Oxides commonly used in the vulcanization of rubber polymers are zinc oxide, magnesium oxide and red lead oxide.

The filler material used with the butadiene and chloroprene polymers are one or more of the substances selected from the class consisting of carbon black; silicates such as calcium metasilicate, aluminum silicate and mica; various clays such as fuller's earth, bentonite, diatomaceous earths, etc.; various metal oxides such as titanium dioxide, chromic oxide, ultrafine silicas, etc.; and sulfates such as barium sulfate, lead sulfate, calcium sulfate, etc. The use of still other inert fillers will readily suggest themselves to those skilled in the art. The amount of filler used is from about 40 to about 95 weight percent based on the weight of the butyl polymer. Forty weight percent filler results in a finished film with good pliability characteristics. Amounts above 95 weight percent are not desirable as an excess of filler impairs its impermeability. The carbon black that is used as a filler can have a particle size of from about 1 to about 100 millimicrons. The particle size of the various other fillers can vary from about 30 to about 300 millimicrons. It is found that the use of carbon black produces satisfactory chemical-resistant compositions. Therefore, chemical-resistant rubber compositions containing carbon black constitute an embodiment of this invention.

Plasticizers are used in the preparation of the chemical-resistant rubber compositions in order to aid the milling of the polymer compositions and also to assist in the curing. Plasticizers found suitable for this purpose are the fatty acids having from about 8 to about 36 carbon atoms and include such compounds as stearic acid, lauric acid, oleic acid, octanoic acid, linoleic acid and linoleic acid dimer. These compounds may be used either singly or as mixtures of two or more in amounts of from 0.5 to about 5 weight percent based on the amount of the butyl polymer employed. An amount of 0.5 weight percent plasticizer improves the ease of processing the composition. Amounts above about 5 weight percent are not employed in order that the adhesive quality of the film not be impaired. Other plasticizers which can be used include such materials as zinc and aluminum stearate which are salts of fatty acids; aliphatic esters such as dibutylsebacate, dioctylsebacate, diisobutyladipate, etc.; aromatic esters such as dioctylphthalate, dicaprylaphthalate, tributoxy ethyl phosphate, tricresyl phosphate, etc.

In order that the components of the composition react and set when heat-treated, it is necessary that sulfur or sulfur-containing agents be included in the butyl and chloroprene polymer composition. Substances useful for this purpose are well known in the rubber field and include such substances as sulfur; thiuram sulfides such as bis(dimethylthiocarbamyl)disulfide; thiazoles such as thiazole and mercaptobenzothiazole; selenium, tellurium, copper, bismuth, and zinc dialkyl dithiocarbamates such as tellurium diethyldithiocarbamate and zinc dimethyldithiocarbamate; and the like.

An amount of 2 weight percent sulfurization agent can be used based on the weight of the butyl polymer employed in order to obtain satisfactory results in the vulcanization process. Greater amounts are sometimes desirable. However, amounts in excess of 15 weight percent do not contribute to the ease of vulcanization.

Still other additives may also be included in the composition as, for example, antioxidants such as phenyl-B-naphthylamine, triphenylphosphate, alkylated phenols, etc. These antioxidants may be added in amounts of up to about 8 percent based on the total weight of the composition. There are many other antioxidants used in the rubber field the use of which will be apparent to those skilled in the art. Accelerators such as mercaptoimidazoline, and p,p'-diaminophenylmethane may also be added in amounts of from 0.1 to about 1.0 weight percent based on the butyl polymer.

In general the butyl and chloroprene polymer-containing compositions of this invention are obtained by milling or masticating a mixture of the components on a rubber mill. When the butyl and chloroprene polymers are milled at the same time, it is necessary that the temperature be kept low. Chloroprene polymer reacts in the presence of a sulfurization agent at a temperature of 75° C. Therefore, it is necessary that the temperature be kept below this value. In order to insure that no reaction occurs during the milling, it is preferable that the temperature be maintained below 60° C. When the composition has been milled for a sufficient length of time so that it is homogeneous throughout, it way be removed from the rubber mill in sheet form. Thereafter it is heat-treated to bring about vulcanization or reaction of the polymers with the sulfurization agent in order to produce a finished chemical-resistant rubber composition.

When employing the composition to form protective film coatings on articles, the milled product, upon removal from the rubber mill, is dissolved in a suitable solvent, applied to the surface to be protected and then heat-treated to bring about curing and setting into a chemical resistant rubber film. This film adheres well to the surface to which it has been applied and is impervious to concentrated polar organic and inorganic acid solutions.

An alternate method of mixing the components prior to the heat-treating can be employed in order to prevent premature setting. The alternate method consists of separately milling or masticating the butyl polmyer and the chloroprene polymer. Each may be milled with a part of the filler and plasticizer components. Since the butyl rubber does not vulcanize or set-up at a low temperature, its temperature may be allowed to go up as high as about 200° C. to 230° C., at which temperature it may be kept for periods of from 5 to about 30 minutes. Thereafter it is cooled to a temperature substantially not in excess of 60° C. and the sulfurization agents milled in. The chloroprene polymer fraction containing no sulfurization agent may be milled at temperatures up to about 60° C. When each fraction has been milled for a period of time sufficient to produce a homogeneous composition, the neoprene polymer fraction can be blended with the butyl polymer fraction at temperatures below that required for vulcanization, that is, at temperatures substantially not exceeding 60° C. The advantage of such separate milling is that the butyl polymer can be more thoroughly masticated without the danger of having the chloroprene polymer set up. The subsequent blending of the masticated polymers will not require as long a time nor will the temperature be increased appreciably. An advantage of heat-treating the butyl polymer prior to the addition of the sulfurization agents is the improved solubility of the polymer compositions in solvents and the higher tensile strength that is imparted to the final cured rubber composition. Hence, the process for the preparation of the compositions of this invention which include the heat treatment of the butyl polymer prior to the addition of the sulfurization agents is a preferred embodiment. As previously described, the composition can be removed from the mill and sheeted by passing through rollers after which it is ready for heat treatments. The final chemical-resistant rubber is obtained by heating the butyl-chloroprene polymer composition to a temperature sufficient to bring about reaction or vulcanization.

When the composition is employed in the preparation of film coating material, the step of milling the chloroprene and butyl polymers together is omitted. Instead, the milled butyl polymer composition and milled chloroprene polymer composition are dissolved in a suitable hydrocarbon solvent and the solution subjected to agitation until a homogeneous composition is obtained. This solution may be reduced with additional solvent until the desired consistency is obtained for application to the surfaces to be protected. The composition is applied to the surface either by a brush, dip, flow or spray technique in one or more coats until the desired film thickness is built up. The coated article is then subjected to an elevated temperature sufficient to bring about vulcanization or setting of the butylchloroprene polymer composition into a chemical-resistant rubber. The film adheres well to the surfaces coated and is especially useful for protecting metal and metal alloy surfaces against the action of corrosive solutions.

The composition of this invention when applied to a metal or a metal alloy article or workpiece and vulcanized by heat-treating, adheres well to the metal surface. An embodiment of this invention is a metal article having an adherent vulcanized rubber protective film thereon which is comprised of the composition of this invention. Nonlimiting examples of metal and metal alloys which may be protected from the action of corrosive chemicals are magnesium, zinc, cadmium, aluminum, titanium, tin, vanadium, antimony, molybdenum, manganese, iron, cobalt, nickel, various alloys of these and other metals, etc.

Another embodiment of this invention is a method of selectively etching predetermined surface areas of metal and metal alloy workpieces comprising applying to the surface of the workpiece a composition of this invention to form a film on the surface, heating the workpiece to a temperature sufficient to bring about reaction and setting of the composition, removing the film from preselected portions of the surface to be etched, immersing the workpiece in an etching solution for a predetermined period of time and thereafter removing the workpiece from the etching solution. The metal and metal alloy workpieces employed to make the novel metal articles having an adherent vulcanized rubber protective film overall, or on predetermined surface, may be of any size and shape. Thus, the instant invention includes the use of metal and metal alloy workpieces which are spherical in shape, are in sheet form, drawn out in wire form, or have an irregular surface.

Compositions of this invention and the methods for their preparation are more clearly illustrated by the following examples.

*Example I*

To a Banbury mixer, at a temperature of substantially 150° C., were added 100 parts of butyl polymer, 65 parts of carbon black, 5 parts of zinc oxide, and 2 parts of stearic acid. The contents were mixed in the Banbury mixer until the temperature reached substantially 204° C. which required about 10 minutes. The temperature rise was due to the heat created by the internal friction resulting from the mixing. The contents of the mixer were next transferred to a two-roll differential rubber mill, and rolled for a period of substantially 5 minutes. This butyl polymer composition was then removed from the roll mill, and heated and maintained at a temperature of substantially 220° C. for a period of substantially 15 minutes. It was then cooled and returned to the roll mill. While mixing on the roll mill, there was then added 2 parts of sulfur, 1 part of bis(dimethylthiocarbamyl)disulfide, 0.5 part of mercaptobenzothiazole, and 1 part of tellurium diethyldithiocarbamate. After the addition of the latter components the composition was taken off the roll mill in sheet form, the sheet rolled into tube form, fed back to the roll mill and milled for about 2 minutes. This procedure was repeated until a homogeneous composition was obtained, which required about 6 cycles of sheeting and feed-back. When homogeneous, the butyl polymer composition was taken off the roll mill in sheet form. The butyl polymer employed in this example was a copolymer of 98 weight percent isobutylene and 2 weight percent isoprene. It had a Mooney viscosity (8 minutes at 212° F.) of 41 to 49 and a specific gravity of 0.92. The polymer is commercially available and is known as butyl polymer GR–I50. A 20 percent solution of the butyl polymer composition in toluene had a viscosity of 600 centipoises at 26° C.

The procedure of Example I was repeated using a butyl polymer obtained by copolymerizing 97.5 weight percent isobutylene and 2.5 weight percent isoprene in place of the GR–I50.

*Example II*

To 100 parts of butyl polymer being processed on a two-roll differential rubber mill were added 30 parts of a carbon black, 8 parts of titanium dioxide, 1 part of lauric acid and the milling continued for a period of substantially 20 minutes. To the butyl composition on the mill was then added 2 parts of zinc oxide, 1 part of sulfur, 0.5 part of bis(diethylthiocarbamyl)monosulfide and 0.5 part of zinc diethyldithiocarbamate. The milling was continued until a homogeneous composition was obtained which required 8 cycles of sheeting, rolling into tube form, and feed-back into the roll mill. The temperature during the milling with the sulfurization agents was kept below 100° C. When the composition was homogeneous, the butyl polymer composition was removed from the roll mill in sheet form. The butyl polymer employed contained substantially 1.5 weight percent isoprene based on the total polymer.

The procedure of Example II was followed using a butyl polymer containing 4.5 weight percent isoprene to prepare a butyl polymer composition.

*Example III*

A butyl polymer composition was prepared by the process of Example II employing the components of Example I in the proportions given therein. This composition had a viscosity of 1100 centipoises at 26° C.

*Example IV*

Following the procedure of Example II a butyl polymer composition is obtained from the following components, the amounts being given in parts by weight.

| | Parts |
|---|---|
| Butyl polymer containing 2 weight percent isoprene | 100 |
| Carbon black | 40 |
| Magnesium silicate | 20 |
| Silica | 20 |
| Zinc oxide | 10 |
| Dilinoleic acid dimer | 5 |

| | |
|---|---|
| Sulfur | 4 |
| Benzothiazolyldisulfide | 4 |
| Tellurium diethyldithiocarbamate | 2 |

A chloroprene polymer composition used in the preparation of the compositions of this invention can be prepared as illustrated in the following two examples.

*Example V*

To 100 parts of chloroprene polymer being processed on a two-roll differential rubber mill was added 40 parts of carbon black. After milling for 20 minutes there was added 20 parts of red lead oxide and the milling continued with 6 cycles of sheeting and feed-back as described in Example I. The temperature during milling was kept below 60° C. When the chloroprene polymer composition thus prepared was homogeneous throughout, it was taken off the roll mill in sheet form. The neoprene or chloroprene polymer used in this example was obtained by polymerization in the presence of 0.6 part of sulfur per 100 parts of chloroprene. The specific gravity of the chloroprene polymer was 1.23.

In like manner, a polymer composition is prepared by the procedure of Example IV using a chloroprene polymer modified with 1 weight percent sulfur.

*Example VI*

Following the procedure of Example V a chloroprene polymer composition is prepared from the following components.

| | Parts |
|---|---|
| Chloroprene polymer | 100 |
| Carbon black | 40 |
| Titanium dioxide | 10 |
| Zinc oxide | 7 |
| Red lead oxide | 10 |

The chloroprene polymer used in this instance was not sulfur modified.

In like manner the composition of Example V is obtained using a chloroprene polymer prepared by polymerizing chloroprene in the presence of 0.1 weight percent sulfur.

Preparation of the butyl polymer-chloroprene polymer compositions of this invention is illustrated in the following examples.

*Example VII*

To 100 parts of the butyl polymer composition of Example II being processed on a two-roll differential rubber mill was added 5.6 parts of the chloroprene polymer composition of Example V and the milling continued as described in Example II until a homogeneous mixture was obtained. When the butyl-chloroprene polymer composition was homogeneous throughout, it was taken off the mill in sheet form. This represented a composition having 5 parts of chloroprene, 3 parts of a reactive metal oxide, 2 parts of a compatible sulfurization agent, 1 part of a compatible plasticizer and 40 parts inert filler, for every 100 parts of butyl polymer.

When the procedure of Example VII was repeated using 16.8 parts of the composition of Example V instead of 5.6 parts, the amount of chloroprene polymer in the composition was 15 weight percent based on the amount of butyl polymer present.

*Example VIII*

Following the procedure of Example VII, 8.5 parts of the composition of Example III were milled with 1.5 parts of the composition of Example V. This produced a butyl-chloroprene composition containing, per 100 parts of butyl polymer substantially, 19 parts of chloroprene polymer, 73 parts of carbon black filler, 5 parts of zinc oxide, 4 parts of red lead oxide (Pb₃O₄), 2 parts of stearic acid plasticizer, and 4.5 parts sulfurization agents.

*Example IX*

Following the procedure of Example II, the following components were milled on a two-roll differential rubber mill:

| | Parts |
|---|---|
| Butyl polymer with 1.5 weight percent isoprene or copolymer | 100 |
| Carbon black | 75 |
| Zinc oxide | 9 |
| Stearic acid | 5 |
| Sulfur | 4 |
| bis(dimethylthiocarbamyl)disulfide | 2 |
| Mercaptobenzothiazole | 2 |
| Tellurium-diethyl-dithiocarbamate | 2 |
| Red lead oxide | 6 |

When the composition in the mill was homogeneous throughout, there was added thereto 30 parts of chloroprene polymer modified with 0.6 weight percent sulfur and the milling continued maintaining the temperature of the composition at a value below 40° C. When the chloroprene polymer had been milled into the butyl polymer composition so as to be homogeneously distributed throughout, the butyl-chloroprene polymer composition was removed from the mill. This represented a composition in which there are 30 parts of chloroprene, 15 parts of a reactive metal oxide, 10 parts of a compatible plasticizer and 95 parts of an inert filler.

*Example X*

To a vessel equipped with agitating means was added 29.3 parts of toluene. In this was then dissolved 8.5 parts of the butyl composition of Example I with the aid of agitation. When the butyl polymer was completely dissolved in the toluene, there was added 1.5 parts of the chloroprene polymer composition of Example V, and the agitation continued until the butyl-chloroprene solution had a homogeneous consistency throughout. The time required for this was substantially 24 hours. At this point an additional amount of 15.2 parts of toluene was added and the solution agitated to provide a chemical-resistant masking composition containing 22.5 percent solids based on the total weight.

Following the procedure of Example IX, a solution was prepared in xylene utilizing 8.5 parts of the composition of Example III together with 1.5 parts of the composition of Example V.

*Example XI*

One part of the composition of VII dissolved in 1 part of xylene provided a butyl-chloroprene polymer composition containing 200 weight percent solvent based on the butyl polymer.

In like manner when 18.5 parts of the composition of Example IX is dissolved in 200 parts of 50—50 mixture of heptane and ethylbenzene, a butyl-chloroprene polymer composition is provided containing 2000 weight percent solvent based on the butyl polymer.

The use of the butyl-chloroprene polymer composition to form a protective rubber coating for workpieces subjected to the action of chemical milling baths is illustrated in the following example:

*Example XII*

A still workpiece was cleaned by subjecting it to the action of an aqueous 3.5 N hydrochloric acid solution for a period of 3 minutes. The workpiece was then rinsed with water and dried. The dry workpiece was dipped into the composition of Example X. The dipping left a film on the surface of the workpiece about 0.002 inch thick. This film was allowed to dry in air for two hours. The dipping and drying procedure was repeated 5 times. Following this, the coated workpiece was heated to 66° C. and the temperature then was raised to 177° C. over a period of substantially 20 minutes. At the latter temperature, it was kept for an additional period of 40 minutes and then cooled to substantially 25° C. This procedure provided a metal workpiece having a butyl-neoprene rubber film 0.01 inch thick. The film was next stripped from the portions of the surface which were to be subjected to the action of a chemical milling solution. The peel test of the film at this stage was found to be 2.5 pounds per square inch. The partially masked workpiece was then immersed in an aqueous steel milling solution comprising 16 percent by weight nitric acid, 45 percent by weight phosphoric acid and 6 percent by weight hydrochloric acid. In a period of 4 hours, the exposed surfaces of the steel workpiece were etched to a depth of 0.24 inch. The workpiece was removed from the etching solution and rinsed with water. The acid solution did not penetrate the protective butyl-neoprene rubber film on the workpiece. The maskant along the edges of the exposed surface remained clean with no evidence of the film lifting away from the surface at these edges. The peel test of the film upon removal from the etching bath was found to be 1.5 pounds per square inch.

In like manner the procedure of Example XII was repeated using the masking compositions of Example XI. Equally good results were obtained.

Aluminum and nickel articles coated as in Example XII were protected from the action of concentrated acid solutions.

*Example XIII*

The masking composition of Example XI was reduced with an equal amount by weight of ethylene dichloride and applied by a spray technique to a titanium workpiece, which was to be subjected to the action of a chemical milling bath. An even coat about 0.001 inch thick was applied to the entire surface of the workpiece. The workpiece was then placed in a heated chamber maintained at approximately 60° C. for a period of 4 minutes to drive off the solvent from the masking composition. Another coat was then applied by the spray method with subsequent evaporation of the solvent as described above. This process was repeated 6 times producing a film 0.006 inch thick. After drying the final coat, the titanium workpiece was subjected to heat at a temperature of substantially 200° C. for a period of 30 minutes and then cooled to substantially 25° C. The film was then stripped from the portions of the surface which were to be subjected to the action of a chemical milling solution, having first outlined a pattern with a sharp instrument cutting through the film. The partially masked workpiece was then immersed in an aqueous titanium chemical milling bath containing 12 percent by weight of hydrogen fluoride and 10 percent by weight of chromic oxide. The workpiece was removed at the end of 48 minutes and washed with water. The surface exposed to the bath was found to have been milled to a depth of 0.052 inch. The solution had not penetrated the masking film on the surface not being milled. After the chemical milling, the masking was removed by hand stripping.

Likewise, similar results were obtained when the procedure of Example XI was repeated using a masking composition composed of 8.5 parts of the composition of Example III, together with 1.5 parts of the composition of Example V dissolved in 45.5 parts of xylene.

A film from a composition prepared as in Example X in which the butyl polymer composition is replaced by a composition in which the polymeric ingredients consist essentially of isobutylene copolymerized with 2 weight percent butadiene, give similar acid resistant protection. A film made in which the butyl polymer is replaced by 2-ethylpentene-1 copolymerized with 3 weight percent 2,3-dimethylhexadiene-1,3 likewise give good protection against the corrosive action of chemical etching solutions.

In the above examples the coating was applied to the surface of the metal workpieces by dipping and spray techniques. The application, however, is not limited to these processes. The butyl-chloroprene polymer composition may also be applied with a brush, allowing for proper drying after the applications of each coat. The same protection against chemical corrosion is obtained by the films applied in this manner.

The thickness of the film on various workpieces varied from 0.006 to 0.02 inch in thickness. Films of this thickness protected the workpiece from the action of chemical etching solution with no indication of penetration of the film by the chemicals for periods of from 2 to about 10 hours.

The drying time after the application of each coat of the butylchloroprene polymer composition to a metal surface is not critical. When the drying is in air at a temperature of substantially 22° C., a period of about 2 hours should be allowed. When, however, the temperature is increased to about 150° C., it is found that 5 to 10 minutes is sufficient to dry off the solvent prior to the application of another coat of the film material, either by dipping, brushing or spraying.

Accelerators normally used with butyl and chloroprene polymers in rubber manufacture can be likewise utilized with the butyl-chloroprene polymer composition of this invention. For example, a modification of the composition of Example II was prepared containing 0.5 part of p-dinitrosobenzene and this composition when used in a butyl-chloroprene protective film on a steel workpiece subjected to the action of a chemical etching solution protected the surface during an exposure time of substantially 6 hours. Likewise, a film in which the chloroprene polymer component was prepared as in Example V together with 1 percent of a piperidinium pentamethylene dithiocarbamate accelerator, gave protection equivalent to that of the film used in Example XII. Other accelerators used are di-o-tolylguanidine salt of dicatecholborate, and 2-mercaptoimidazoline.

The tensile strength of the protective films of this invention varied from 1300 to 1600 p.s.i. when the film had a thickness of substantially 0.01 inch. The elongation characteristic of the film was substantially 400 percent at the breaking point. Hence, the composition of this invention provides a film which can be readily stripped from the surface both before and after exposure to the chemical etching solution.

The use of the butyl-chloroprene polymer composition for film purposes has the advantage of giving a film which not only is impermeable to the action of corrosive chemical solutions, but is itself not appreciably attacked by the solution so that the film can be readily stripped from the surface after exposure to the corrosion agents. This is to be compared with a film made from butyl polymer alone, which when exposed to a steel etching bath is attacked by the acids making the film gummy. After removal from the etching solution, the butyl film cannot be stripped from the surface because it has lost its cohesive quality. When the film is prepared from chloroprene polymer alone, without the use of butyl polymer, it is readily attacked by the acids of chemical etching solutions. Furthermore, as the etching proceeds and metal is dissolved in the solution in the form of metal salts such as ferric chloride, for instance, the attack on the chloroprene rubber film is accelerated. The solution chars and penetrates the film and attacks the surfaces which were to be protected. The combination of butyl polymer and neoprene polymer in the proper proportions, giving the composition of this invention, overcomes the shortcomings of the individual butyl polymer films and chloroprene polymer rubber films and provides a film composition which upon heat-treating sulfurization is not attacked by the etching solutions. The film of this composition does not become gummy nor is it attacked by the acids, and gives satisfactory protection during chemical etching.

Although the invention has been described and illustrated in detail, it is to be clearly understood that the same is by way of illustration and example only and is not to be taken by way of limitation, the spirit and scope of this invention being limited only by the terms of the appended claim.

I claim:

A method of selectively etching a predetermined surface area of a steel workpiece with the use of a masking composition consisting essentially of 100 parts of an unvulcanized polymer obtained by copolymerizing an aliphatic isoolefin having 4 to 7, inclusive, carbon atoms per molecule with a minor proportion of a conjugated aliphatic diolefin having 4 to 8, inclusive, carbon atoms per molecule; about 5–30 parts of unvulcanized chloroprene polymer; about 2–10 parts of a vulcanizing agent, about 40–95 parts of an inert filler, and about 200–2000 parts of a compatible solvent; the method comprising the steps of applying a plurality of superimposed layers of said composition to and throughout a surface of said workpiece greater than and including said predetermined area; drying each of said layers before applying the next layer and drying the last applied layer, said plurality of dried layers constituting a film; heating said film to a temperature sufficient to effect vulcanization of said film; removing that portion of the vulcanized film covering said predetermined area and leaving the remainder of the vulcanized film as a maskant; applying a steel etching solution for a predetermined period of time throughout said predetermined area to effect etching, and thereafter removing said maskant.

References Cited

UNITED STATES PATENTS

| | | |
|---|---|---|
| 2,311,004 | 2/1943 | Thomas et al. |
| 2,503,637 | 4/1950 | Sarbach _____ 260—45.5 |
| 2,711,383 | 6/1955 | Ruggeri et al. _____ 154—43 X |
| 2,885,273 | 5/1959 | Oelgoetz et al. _____ 156—11 |
| 2,888,335 | 5/1959 | Atkins et al. _____ 156—12 |

OTHER REFERENCES

"Engineering with Rubber," by Burton, 1949, pp. 309–321 relied on.

Whitby: Synthetic Rubber, John Wiley & Sons, Inc., (1954), pp. 767, 785–787 and 854.

ALEXANDER WYMAN, *Primary Examiner.*

JACOB H. STEINBERG, EARL M. BERGERT, *Examiners.*

W. POWELL, *Assistant Examiner.*